United States Statutory Invention Registration [19]

[11] Reg. Number: H855

Otto et al. [43] Published: Dec. 4, 1990

[54] OPTICAL BEAM SWITCHING CIRCUIT FOR PHOTOVOLTAIC ENERGY CONVERSION

[75] Inventors: William F. Otto, Huntsville; Richard D. Milton, Lacey's Spring; Debbee J. Jordan, Huntsville, all of Ala.

[73] Assignee: The United States of America as represented by the Secretary of the Army, Washington, D.C.

[21] Appl. No.: 517,017

[22] Filed: Apr. 30, 1990

[51] Int. Cl.[5] ..... G02B 6/26

[52] U.S. Cl. ..... 350/96.2

*Primary Examiner*—Linda J. Wallace

*Attorney, Agent, or Firm*—James T. Deaton; Freddie M. Bush

[57] ABSTRACT

Optical power is supplied to a remote location and switched between conversion circuits for converting the optical power to electrical power to remotely power a system or device. Laser light is guided by a fiber optic to illuminate photovoltaic cells to produce the electrical power. The electrical current from the cells is made to alternate by switching the light between the cells and using a transformer to step up the voltage. This allows power to be supplied to a remote area without disrupting the existing electromagnetic fields in the area and where space and voltage requirements are limited such that the use of many photovoltaic cells is prohibitive.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OPTICAL BEAM SWITCHING CIRCUIT FOR PHOTOVOLTAIC ENERGY CONVERSION

DEDICATORY CLAUSE

The invention described herein may be manufactured, used, and licensed by or for the Government for governmental purposes without the payment to us of any royalties thereon.

BACKGROUND OF THE INVENTION

In supplying electrical power into isolated or remote locations, the use of electrical conductors can routinely provide service for most power requirements. Electrical wires can act as antennas picking up external electromagnetic radiation and conducting it into the sensitive test environment and altering the test conditions. An alternate method to deliver power and avoid the above problems is to transmit power optically. The laser light has been conveyed by non-conductive fiber optics to photovoltaic cells. However, these cells produce a low voltage and many cells are required to be coupled in series to produce higher voltages. Additionally, space requirements for the cells can be prohibitive and uniform distribution of optical power to each cell difficult.

SUMMARY OF THE INVENTION

Optical power is coupled through a region to provide power to a remotely located system allowing the power to be coupled into the system. The optical energy is alternated or switched between two photovoltaic cells. The two cells are electrically coupled to a transformer for stepping applied voltage up to a desired operating level for the system. Switching between two cells allows energy conversion to occur in the transformer without requiring additional switches. The step-up transformer in conjunction with the use of only two photocells allows the desired level of voltage to be obtained within limited space constraints.

DESCRIPTION OF THE PREFERRED EMBODIMENT

Figure 1:
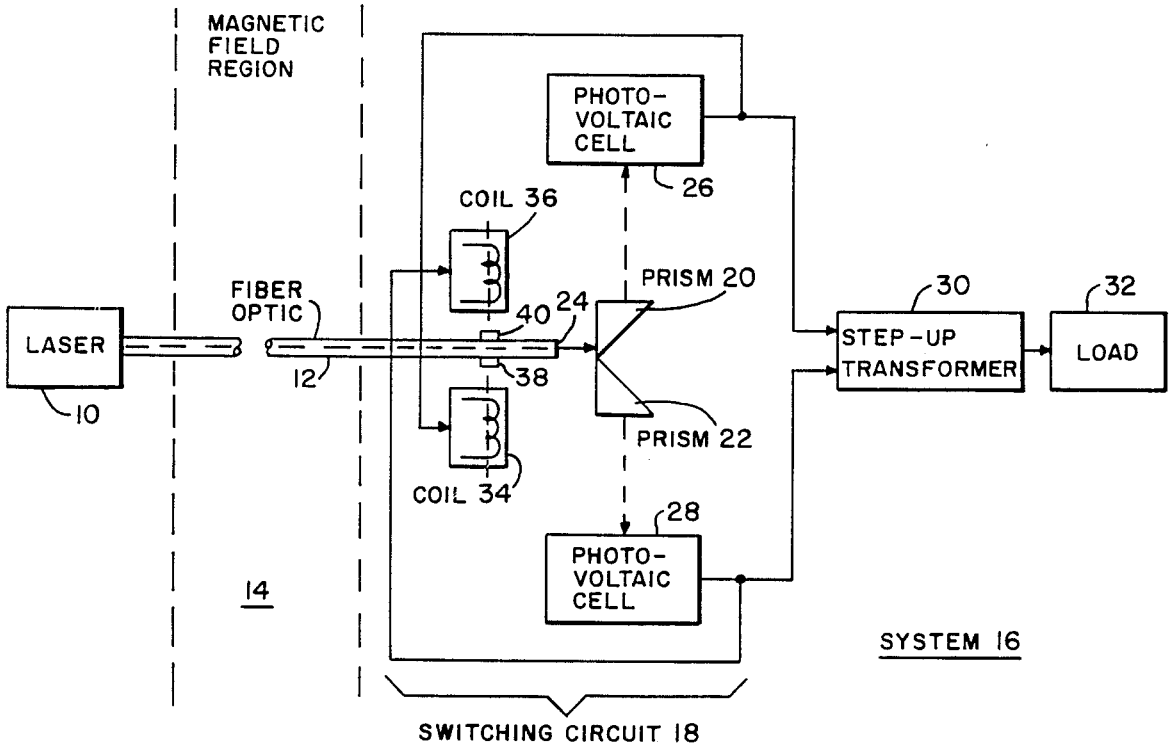
FIG. 1 is a simplified diagrammatic view of a system incorporating the optical switching circuit.

Referring now to the drawing wherein like numbers refer to like parts, FIG. 1 discloses a diagrammatic view of a typical system wherein an optical switching and energy conversion circuit allows an electrical voltage to be developed from optical energy within a confined space and after traversing an area without modifying the prevailing magnetic fields surrounding the system. As shown, a laser 10 is disposed to direct laser light (optical energy) into a single fiber optic filament 12 for conveying the light across a region 14 in which prevailing magnetic fields are present and are not to be disturbed. While the fiber optic filament is shown to be straight, it is recognized that the filament may cover a circuitous route between terminal points without adversely affecting the light passing through. Filament 12 leaves region 14 and enters system 16. System 16 may be specifically isolated from the region 14, may be exposed to it, or may be encompassed by it. Once the light energy has entered the system 16, it can be converted to electrical energy. System 16 may be one of many systems requiring power. The supplied power may be for routine operational power, power for evaluating the effects of existing electromagnetic fields or effects of radiation on the system. Typically, system 16 may be a telemetry system, missile system, aircraft guidance, or communication repeater link. The switching function within system 16 is performed by circuit 18 wherein prisms 20 and 22 are disposed adjacent to the end 24 of fiber optic 12 for alternately receiving light passing through the fiber optic. This light is redirected by prism 20 to photovoltaic cell 26 and by prism 22 to photovoltaic cell 28.

Cells 26 and 28 convert the optical input into output voltage which is directed primarily, alternately to the step-up transformer 30 to provide the voltage or voltages for load 32 or several loads as the needs of the system dictate. The voltage output from cells 26 and 28 is also developed across electromagnetic coils 34 and 36. These coils act magnetically on ferrous elements or other magnetic field sensitive elements 38 and 40 attached to fiber optic 12 adjacent end 24.

Figure 3:
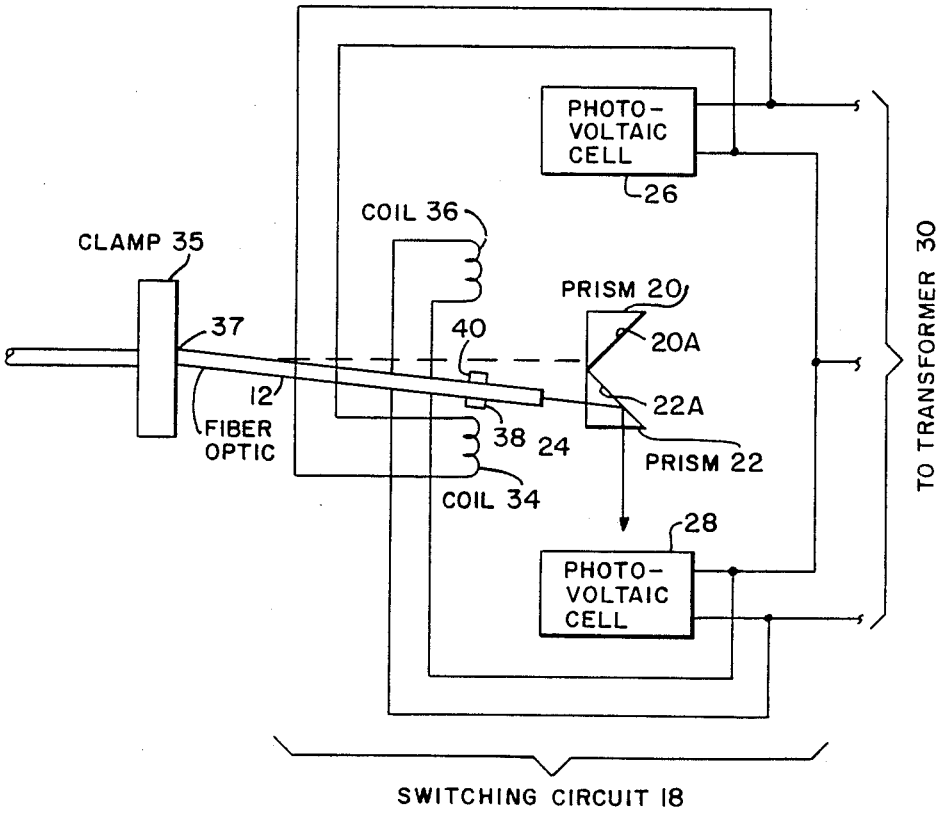
FIG. 3 is a partial diagram of the optical switching circuit of FIG. 2 energized.
Figure 2:
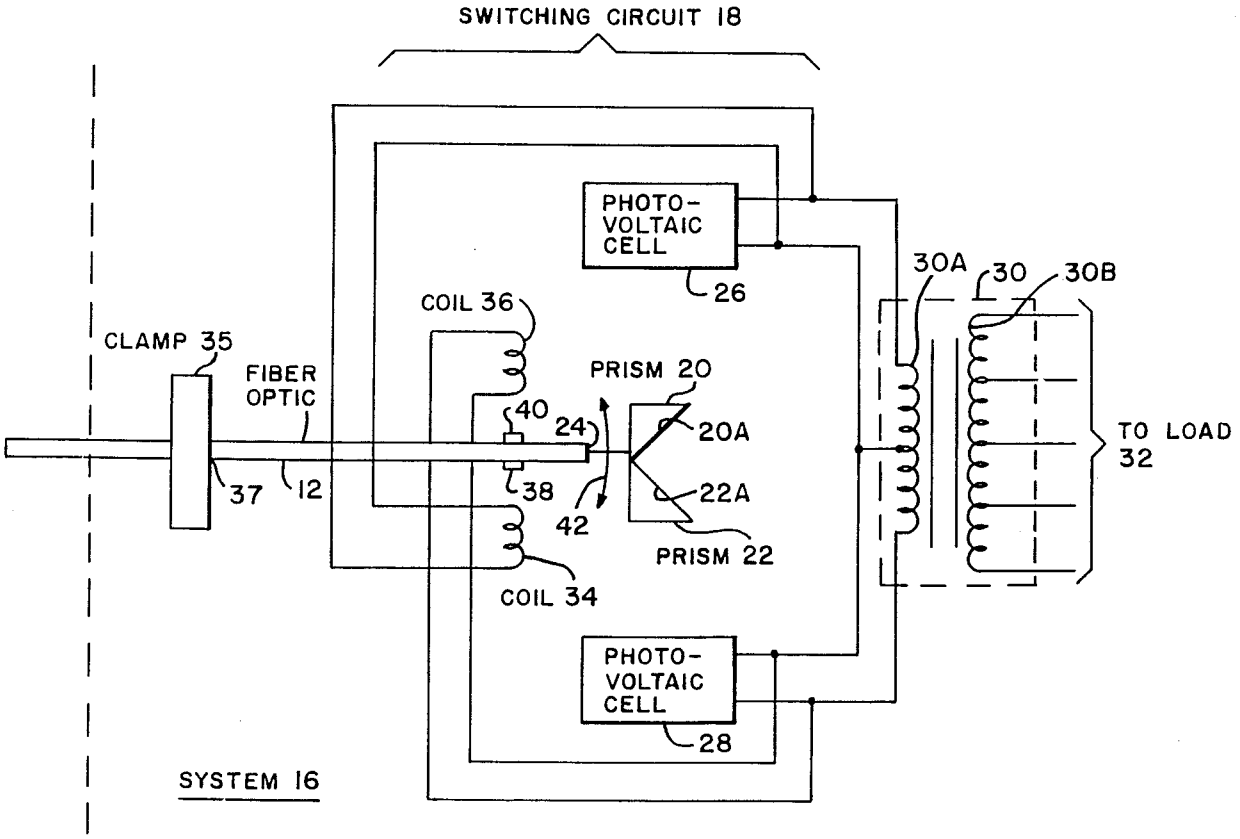
FIG. 2 is a diagram of the optical switching circuit at rest.

The operation of the switching circuit is shown more particularly in FIGS. 2 and 3. The optical power from the laser is coupled through fiber optic 12 exiting at end 24. With the system at rest, fiber end 24 is facing prism 20 so that when laser light is supplied through the fiber, sufficient energy is coupled into prism 20 and reflected to photovoltaic cell 26 to energize the system. Prisms 20 and 22 are aligned respectively with cells 26 and 28 to direct a balanced or equal amount of energy to the respective cells during operation. Magnetic field sensitive members 38 and 40 are respectively positioned on and attached to opposite sides of fiber 12, near end 24. These sensitive members 38 and 40 are positioned with respect to magnetic field generating coils 34 and 36 respectively such that when current flows through one of the coils the magnetic field generated by the coil will attract the associated sensitive member, drawing it toward the coil and thereby precisely aligning end 24 with the appropriate prism to control the path of the optical energy between the two prisms. These prisms have total internal reflection properties (TIR) i.e., when light meets a material with a lower refractive index at the critical angle or steeper, all of the light is reflected back into the material with a higher refractive index. Thus, laser light entering prism 20 reflects from surface 20A to photovoltaic cell 26 and light entering prism 22 reflects from surface 22A at cell 28. A clamp 35 is used to hold fiber 12 secure and provides a stationary pivot point 37 for fiber end 24. The pivot point need not be precisely located with respect to fiber end 24 but should be sufficiently close to the fiber end to maintain movement of the fiber substantially within a single plane to assure that the end 24 sweeps laser light substantially along the same path as it moves back and forth in response to coils 34 and 36. The photovoltaic cells 26 and 28 have their outputs connected in push-pull across the low voltage winding 30A of transformer 30. This induces an alternating magnetic flux in the transformer core. The secondary winding 30B has a large number of turns and is tapped to provide an output voltage selection.

In operation, incoming continuous wave laser light exits end 24 and initially impinges on prism 20, reflecting from surface 20A to the photovoltaic cell 26. Cell 26 converts the received optical energy into electrical energy and develops a voltage across both transformer 30 and coil 34. Coil 34 energizes, drawing the fiber 12 toward the coil (shown more particularly in FIG. 3) and thereby directing fiber end 24 to prism 22 and removing illuminating light from prism 20. Light passing through prism 22 illuminates cell 28 directing the current flow in the opposite direction through transformer 30 and simultaneously energizes coil 36 which draws fiber 12 back toward coil 36. This cycle continues to repeat itself as long as laser light is coupled into the system, thereby oscillating or moving fiber end 24 back and forth in plane 42 passing through coils 34 and 36. This oscillating or switching action results in a voltage supply that is remotely turned on by the energization of the remotely located laser and provides an alternating current power source within the system. The alternating current from transformer 30 may be used as is or it may be filtered and further refined according to particular system demands.

Magnetic field sensitive means 38 and 40 need not be two separate elements but can be a single ring or sleeve of material, such as ferrous material around fiber 12.

Similarly, prisms 20 and 22 may be replaced with other beam directing means or omitted entirely, since the fiber can be switched to direct energy directly between the cells 26 and 28 by positioning the cells close together. The prisms allow faster switching between the cells.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. An optical beam switching and energy conversion circuit comprising: a single fiber optic filament for conveying light therethrough, first and second photocells, a moveable first end of said fiber optic filament positioned for directing light as an output alternately toward said photocells, means coupled to said filament for moving said first end of the filament and directing said first end back and forth in a plane, said first and second photo cells each generating an electrical voltage output in response to optical energy input, and a voltage path coupled between the electrical voltage output of said first and second photocells and said means for moving said first end of the filament.

2. An optical beam switching and energy conversion circuit as set forth in claim 1 wherein said photocells are photovoltaic cells.

3. An optical beam switching and energy conversion circuit as set forth in claim 2 wherein said means for moving said first end of the filament comprises first and second coils disposed on opposite side of said filament adjacent said first end and a magnetic field sensitive member attached to the periphery of said filament for responding to electromagnetic fields periodically generated by said coils for moving said filament first end in said plane, said first coil being coupled to receive an output from said first photocell, and said second coil being coupled to receive an output from said second photocell.

4. An optical beam switching and energy conversion circuit as set forth in claim 3 and further comprising first and second prisms disposed in the optical path between said first and second photovoltaic cells respectively and said fiber optic filament first and for directing optical energy from said filament to said cells.

* * * * *